(12) United States Patent
Huisma (10) Patent No.: US 6,427,627 B1
(45) Date of Patent: Aug. 6, 2002

(54) METHOD OF MONITORING ANIMAL FEEDING BEHAVIOR

(75) Inventor: Camiel Huisma, Airdrie (CA)

(73) Assignee: Growsafe Systems Ltd., Airdrie (CA)

( * ) Notice: Subject to any disclaimer, the term of this patent is extended or adjusted under 35 U.S.C. 154(b) by 0 days.

(21) Appl. No.: 09/527,710

(22) Filed: Mar. 17, 2000

(51) Int. Cl.$^7$ ............................................. A01K 29/00
(52) U.S. Cl. .................................................. 119/51.02
(58) Field of Search .................. 119/14.03, 51.02, 119/859, 908

(56) References Cited

U.S. PATENT DOCUMENTS

| | | | |
|---|---|---|---|
| 4,247,758 A | 1/1981 | Rodrian | 377/6 |
| 4,618,861 A | 10/1986 | Gettens et al. | 340/825.54 |
| 4,864,158 A | 9/1989 | Koelle et al. | 327/31 |
| 5,084,710 A | 1/1992 | Whittington | 343/876 |
| 5,128,669 A | 7/1992 | Dadds et al. | 340/901 |
| 5,309,864 A * | 5/1994 | Harmsen et al. | 119/51.02 |
| 5,428,363 A | 6/1995 | D'Hont | 343/742 |
| 5,653,192 A * | 8/1997 | Sheen et al. | 119/51.02 |
| 5,711,246 A * | 1/1998 | Yano et al. | 119/51.02 |
| 5,729,236 A | 3/1998 | Flaxl | 342/374 |
| 5,901,660 A | 5/1999 | Stein | 119/51.02 |

FOREIGN PATENT DOCUMENTS

EP 0 624 313 A1 11/1994 ........... A01K/11/00

* cited by examiner

*Primary Examiner*—Robert P. Swiatek
(74) *Attorney, Agent, or Firm*—Davis & Bujold, P.L.L.C.

(57) ABSTRACT

A system and method having a plurality of antennas located at selected spaced intervals along an elongate feed or drinking trough. Each animal, to be monitored, is equipped with a passive transponder having a unique identification code. An electronic control system transmits an electronic signal sequentially to each one of the plurality of antennas such that each activated antenna emits a signal and, any passive transponder sufficiently adjacent to the activated antenna, receives the signal and generates a return electronic signal which is sent to the activated antenna. A computer, coupled to the plurality of antennas, receives a return signal from the passive transponder and generates preliminary results concerning an animal behavior which effects animal consumption activity. Finally, a modification factor, incorporated in the computer, modifies the preliminary results to generate a final result that predicts, with an acceptable level of predictability, the animal behavior which affects the consumption activity to be monitored.

20 Claims, 5 Drawing Sheets

METHOD OF MONITORING ANIMAL FEEDING BEHAVIOR

FIELD OF THE INVENTION

This invention relates to a passive transponder identification system and a method of using the same, more specifically, a system which is capable of being used with multiple transponders to monitor the feeding and drinking behavior of animals in order to predict a variety of conditions relating to health, productivity and quality.

BACKGROUND OF THE INVENTION

Over the past forty years or so passive radio frequency identification has been used to automatically identify objects. One example of a practical application of this technology is in monitoring the feeding and drinking habits of animals. Passive transponder technology has been used to monitor animal feeding behavior when animals are in a closely controlled environment with each animal having its own feeding stall. In such situations, it is possible to monitor weight loss or gain by utilizing conventional weighing devices.

Studies on animal behavior have determined, however, that side by side feeding in long troughs induces competitiveness between the animals which results in, among other things, increased feed intake and faster growth of the animals.

The basic elements of such systems include a reader/transmitter, an antenna and a transponder. The reader/transmitter sends an electromagnetic charge wave through the antenna to the transponder, which uses this energy to transmit a radio frequency signal back through the antenna to the reader/transmitter. Typically, the signal includes an identification code unique to each transponder. In order to monitor the activities of large herds or confined groupings of animals, one must be able to monitor multiple transponders in a relatively small area. With currently available technology it is extremely difficult to read multiple transponders using one reader/transmitter.

If each one of the multiple transponders uses the same frequency to transmit its unique identification code back to the reader/transmitter, a single reader/transmitter is unable to readily decipher each individual identification code. In order to make systems with multiple transponders operational, multiple reader/transmitters are required which, in turn, render such systems costly, and will also reduce the area in which the transponders can be simultaneously read.

SUMMARY OF THE INVENTION

Wherefore, it is an object of the present invention to overcome the aforementioned problems and drawbacks associated with the prior art designs.

Another object is to provide a passive transponder identification system that is capable of transmitting to and reading signals sent from multiple transponders, even if all of the transponders utilize the same frequency.

A further object of the present invention is to provide an unobtrusive system and method of monitoring the feeding behavior of animals that is adapted for use in a confined side by side feeding and/or drinking environment.

It is another object of the present invention to allow more accurate monitoring of the animals to occur by improved positioning of the antennas. For example, the inventors have obtained beneficial results by having a plurality of antennas integrally formed or molded into a large flexible mat which is then installed as a lining along an elongate feeding or drinking trough.

Still another object of the present invention is to increase the read range of the transponders while still keeping the system as inexpensive as possible. For example, in a preferred form of the invention, a panel, which houses an RF Generator, is mounted in the central region of the flexible mat housing the plurality of antennas. Alternatively, in a further effort to reduce the manufacturing costs of the flexible mats, it is beneficial to print a conductive ink on a non-conductive substrate to which metals can be plated. Both sides of the substrate are utilized to keep the inductance of the wire(s) leading to the antennas as low as possible.

Yet other objects of the present invention are: (1) to reduce the thickness of the flexible mat, (2) to provide a more sturdy and lightweight flexible mat, and (3) to provide a flexible mat that can be readily glued to a conventional feeding or drinking trough to thereby facilitate minimal maintenance of the flexible mat while still providing for a secure attachment of the flexible mat to the feeding or drinking bunk. It is to be appreciated that for utilization in agricultural environments, the flexible mat must be very easy to install, service, connect, disconnect, etc.

Still another object of the present invention is to provide a panel, housing a RF Generator, equipped with data storage capabilities and a transmission mechanism to facilitate transmission of data from the panel by means of infrared technology or RF technology. Such remote transmission minimizes the amount of wiring that is necessary for use in this system and avoids the need to have a plurality of wires running from the remote data collection locations to a central monitoring location. The running of such wires, especially in agricultural environments, is costly and such wires can also readily become damaged and/or disconnected.

A further object of the present invention is to provide computer software to collect data and facilitate analyzing of the behavior of various animals to be monitored in view of the collected data. In a preferred form of the invention, the software is designed to segregate each day into a plurality of different time periods to highlight the diurnal and nocturnal behavior of animals. By segregating the day into a plurality of time periods, it is possible to distinguish between the various time periods of the day and determine the total elapsed time actually spent feeding or drinking at a trough. The software can then either discount or augment the determined total elapsed time spent feeding or drinking at a trough, by use of a suitable adjustment factor, to allow more accurate prediction of the actual consumption of feed or water by each animal during the determined total elapsed time. The segregation of the day in a plurality of different time periods, in turn, allows a more accurate prediction of whether the animal is sick, healthy, feeding normally, feeding abnormally, has acidosis, etc.

According to the present invention there is provided a passive transponder identification system which includes a plurality of transponders, a microprocessor, a single reader/transmitter coupled to the microprocessor, and a computer. A plurality of antennas are provided and each antenna is coupled, via a signal relay circuit, with the microprocessor and the reader/transmitter to facilitate transmission and reception of signals. The microprocessor sequentially activates each one of the plurality of antennas, via the signal relay circuit, to send a signal from the single reader/transmitter to any adjacent transponder(s). An exchange of signals occurs between any adjacent transponder(s) and the activated antenna during the activating sequence. The computer records the transmitted and received signals and maintains and manipulates the obtained data to generate the desired monitoring information.

The present invention also relates to a method of monitoring feeding behavior. The first step involves positioning a plurality of antennas at selected spaced intervals along an elongate feeding or drinking trough. The second step involves equipping each animal with a passive transponder with a unique identification code. The third step involves coupling the antennas to the computer which monitors the desired activities of the animals feeding and/or drinking side by side at the trough for animal behaviors which can effect feeding behavior. The last step involves interpreting the data to predict a desired behavior of the animal to be monitored.

The present invention relates to a method of monitoring animal feeding behavior, comprising the steps of:

provid­ing a plurality of antennas at predetermined locations along one of a feeding location and a drinking location to be monitored;

providing each of a plurality of animals with a passive transponder having a unique identification code;

transmitting an electronic signal from at least one of said plurality of antennas to any sufficiently adjacent animal provided with a passive transponder and receiving a return electronic signal from any sufficiently adjacent passive transponder;

processing said return electronic signal via a computer, to determine preliminary results relating to an animal behavior which affects animal feeding characteristics; and modifying the preliminary results via a modification factor to generate a final result that predicts, with an acceptable level of predictability, the animal behavior which affects a consumption activity to be monitored.

The present invention also relates to a system for monitoring animal feed behavior, said system comprising: an elongate mat having a plurality of antennas spaced therealong; a plurality of passive transponders, each passive transponder having a unique identification code so that when the passive transponder is affixed to an animal, the passive transponder facilitates identification of that animal; an electronic control system for transmitting the electronic signal sequentially to each one of said plurality of antennas such that an activated antenna emits the signal and, any sufficiently passive transponder sufficiently adjacent to the activated antenna, receives the signal and generates a return electronic signal which is sent to the activated antenna; a computer, coupled to said plurality of antennas, to receive a return signal from the passive transponder and generating preliminary results to an animal behavior which effects animal feeding characteristics; and modification factor, incorporated in the computer, for modifying the preliminary results to generate a final result that predicts, with an acceptable level of predictability, the animal behavior which effects a consumption activity to be monitored.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
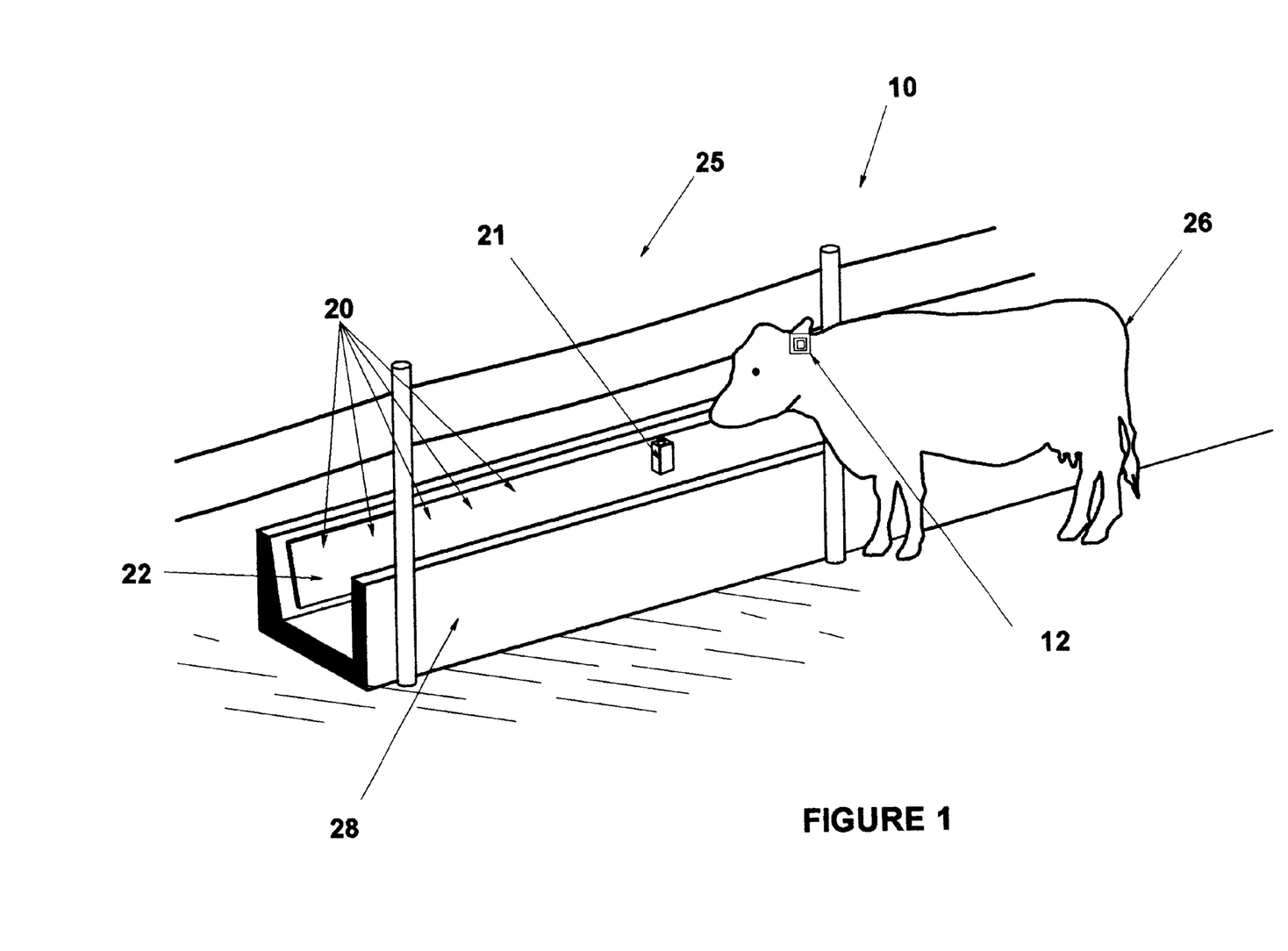
FIG. 1 is a diagrammatic perspective view of the system for monitoring animal feeding or drinking behavior of animals in accordance with the teaching of the present invention.
Figure 2:
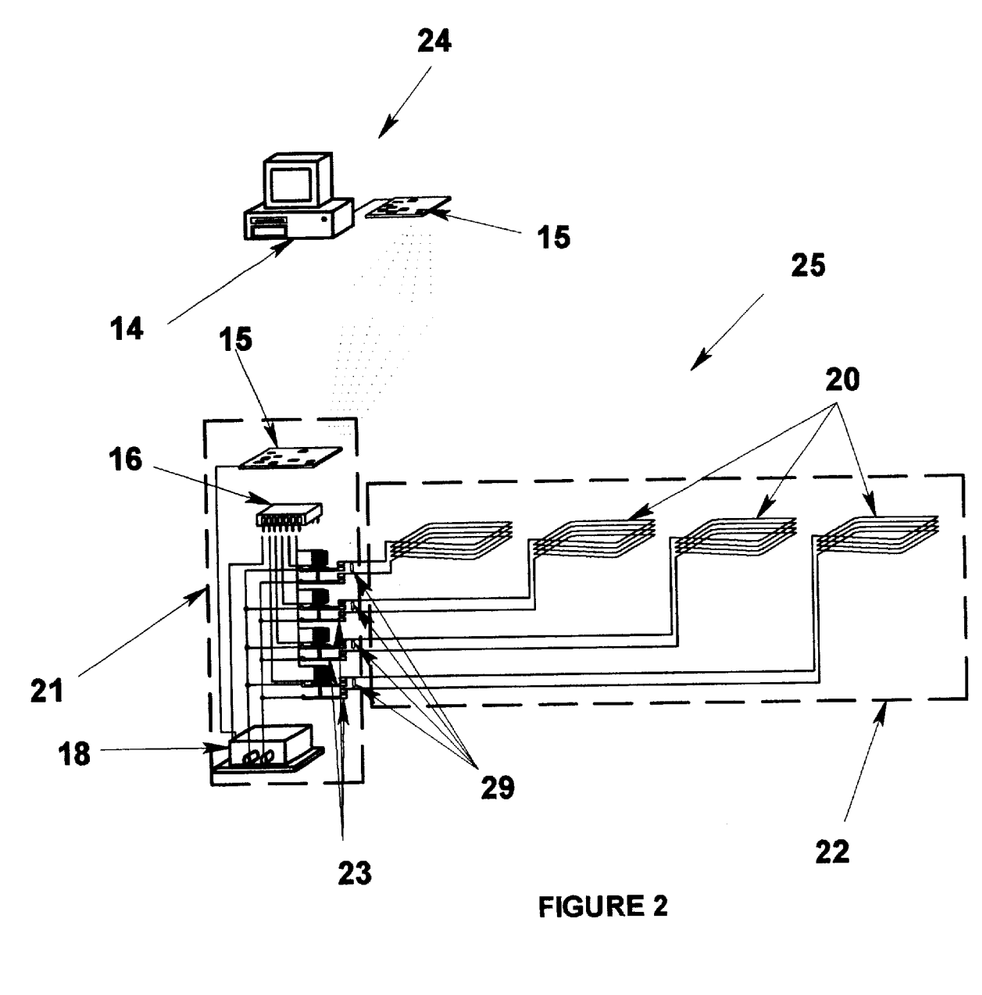
FIG. 2 is a diagrammatic schematic representation showing details of the various components comprising the system of the present invention.

Turning now to FIGS. 1 and 2, a detailed description concerning the basic components of the present invention will first be provided. As shown in these Figures, a passive transponder identification system 10 generally includes a plurality of transponders 12 (only one of which is shown in FIG. 1), a computer 14 (preferable a remotely located computer), a microprocessor 16, a single reader/transmitter 18, a plurality of antennas 20 and a flexible mat 22.

The reader/transmitter 18 is coupled to the microprocessor 16 by conventional electrical wiring (not separately labeled) and both components are contained within a sealed container or housing 21 located preferably at a central location along the mat 22. Each antenna 20 is coupled, via a separate relay circuit 23, to both the microprocessor 16 and the reader/transmitter 18, in a conventional manner, to facilitate conveyance of signals to the antennas 20 and return of any received signals from the antennas 20. The microprocessor 16, in turn, is coupled (e.g. hard wired or preferably via infrared or RF technology 15) to a computer 14 to transmit field data and other information between the field installation 25 and the central data collection location 24 which can record and manipulate the received data to monitor virtually any desired activity of the animal 26.

A separate transponder 12, each with a unique identification code, is implanted, secured or otherwise attached to each individual animal 26 to be monitored. Alternatively, a bowless device, which includes a transponder 12, can be swallowed by each animal 26 and used to monitor animal activities The remaining components of the passive transponder identification system 10 is positioned at the central data collection location 24, e.g. a control facility. With the passive transponder identification system 10 described above, it is possible for eighty or more transponders 12 to be accommodated within a relatively small confined area A, e.g. a 175 square foot confined area, for example.

It is preferred that the number of antennas 20 approach the number of transponders 12, i.e. be substantially equal to the number of transponders 12 to be located within the confined area. However, beneficial results have been obtained when one antenna 20 is provided for every two transponders 12 located within the confined area A. The microprocessor 16 is programmed to sequentially activate each one of the plurality of separate spaced apart antennas 20 (or every other antenna 20 to speed up the reading time of the system without compromising the accuracy of the system) via the respective signal relay circuits 23, to send a transmission signal from the single reader/transmitter 18 and, in turn, receive a return signal from any transponder(s) 12 located sufficiently close (e.g. about 36 inches or so) to the activated antenna 20. An exchange of signals occurs between any sufficiently adjacent transponder(s) 12 and the activated antenna 20 during the activating sequence.

In order to optimize the reading distance, it is preferred that each antenna 20 be wound such that the introduced induction/capacitance still allows for optimum resonance. It is also preferred that a minimum capacitance and inductance be introduced into each of the signal relay circuits 23. Preferably the circuit 23 measures inductance and introduces the desired amount of capacitance. In order to reduce inductance, the traces should be kept as parallel as possible. In order to reduce resistance, multi-strand wire can be utilized. Extra resistance and/or capacitance can be added on each individual antennas 20 to make the read range of all of the antennas equal to one another The read speed of the system is linear and relates to the number of antennas 20 employed by the passive transponder identification system 10. To optimize the accuracy of duration measurements, it is important to keep the reading speed as short as possible. The passive transponder identification system 10 is designed so that it will not be switched to sequentially activate another antenna 20 while the signal relay circuit 23, for one antenna 20, is still active. Otherwise the inductance and/or the capacitance will create a sparking action over the circuit contacts that adversely affect the longevity of the circuit transistors and signal relays. The signal relay circuit 23 should be inactive for as short a time period as possible during which time the relay is either opened or closed. In addition, it is preferred that the power loads be kept as low as possible so as not to interfere with other associated equipment utilized by the system.

In a preferred form of the invention, the plurality of antennas 20 are sequentially activated by the passive transponder identification apparatus 10, one after another, about every one-tenth of a second for a duration of about 105 milliseconds. By this arrangement, any transponder 12 which is between about 0 inches to about 36 inches away from the activated antenna 20 is sufficiently energized or activated so as to generate and send a return signal to the activated antenna 20 which is received by the activated antenna 20 and conveyed to the computer 14, by a remainder of the passive transponder identification system 10, so that the animal carrying the activated transponder 12 can be suitably identified and monitored.

Suitable models and manufacturers, for some of the key components of the system, according to the present invention, are as follows: the transponder 12 may be manufactured by Allflex USA of Texas or by Tiris (Texas Instruments); the reader/transmitter 18 may be model number 2510 manufactured by Tiris (Texas Instruments), the antennas 20 may be obtained from GrowSafe Systems Limit of Alberta Canada and the computer 14 may be a standard personal computer.

Now that the basis components of the present invention have been described, the method of using the passive transponder identification system 10, according to the present invention, will now be described in detail. The first step involves positioning a plurality of antennas 20 at selected spaced intervals, e.g. spacing the antennas 20 at a distance of between about 6 inches to about 18 inches apart, along an elongate trough 28, for example a feeding or a drinking trough. The preferred manner of doing this is to have the plurality of antennas 20 molded sequentially into a large flexible mat 22 which is installed as a permanent or semipermanent lining on either an inwardly or an outwardly facing surface of the trough 28, or possibly molded as an integral part of the trough.

The second step involves equipping each one of the animals 26 to be monitored with a passive transponder 12. As noted above, each passive transponder 12 is provided with a unique identification code indicative of only the animal 26 to which that passive transponder 12 is equipped or installed. As the feature of providing a unique identification code to each passive transponder 12 is conventional and well known to those skilled in this art, a further detailed description concerning the same is not provided herein.

Referring now to FIG. 2, the third step involves coupling the antennas 20, via the microprocessor 16, to communicate with the computer 14 to transmit and receive the necessary signals so as to enable monitoring of the desired activities of the animals 26 as they feed or drink side by side at a feeding or watering trough 28.

The computer 14 typically monitors one or more desired animal behaviors which can effect or be used to predict desired feeding, drinking, or other behaviors of animals, e.g. there are various factors that can be easily and fairly accurately monitored by the present invention. Some of the more important behaviors to be monitored include, for example, monitoring which animal feeds or drinks beside which other animal(s). This enables the bossy animals, which are disruptive to feeding of the other animals, to be quickly identified and removed at an early stage to minimize the disruption to other animals. Monitoring which animals feed first helps to identify the animal hierarchy and the eagerness of the monitored animal to feed. The time duration that each animal feeds or drinks provides an indication of the feed or water intake of the monitored animal. Monitoring which area of the trough that each animal frequently feeds at enables different mixes to be utilized for different animals to meet different nutritional requirements of the various animals being monitored and also facilitates experimentation with different feed mixes. Monitoring when a particular location of the trough becomes empty enables cross-checks to be performed as to the amount of feed consumed by the animals feeding at each monitored location of the trough. Monitoring deviations in the feeding activity of an animal, in comparison to the feeding activities of the other animals, allows alternative feed mixes to be tried with such animals. Monitoring any deviations in animals feeding activity, as compared with the normal feeding activities for that animal, enables a sick animal to be quickly identified, quarantined, and treated before any significant weight loss has occurred and also before any other animals may become similarly infected.

The measurements to be taken, according to the system and method of the present invention, generate an animal position location as well as a time stamp indicative of the total time that an animal is located at the feeding or drink trough 28. It is important to note that a variety of assumptions are made, in mathematical equations employed by the present invention, to allow the measurements to be utilized to predict, within an acceptable range, the behaviors to be monitored.

For example, it is known that the feed intake rate (i.e. the consumption of feed per minute) dramatically increases when there is a perception of competition among the animals 26. This perception is also hidden within raw data by means of calculating how many animals are at the feeding or drink trough 28 at the same time. Other information relevant to the feed intake rate is, for example, the distance between a specific animal being monitored and any adjacent neighbor(s) while feeding at the feeding or drink trough 28.

The feed intake rate is also dependent upon the total elapsed time of the event (e.g. the time at which the animal was first seen at the feeding or drink trough 28 to the time the animal leaves the feeding or drink trough 28) versus the actual time the animal had its head located in the feeding or drink trough 28 for feed or drinking purposes.

Another important factor in determining the feed intake rate is the positional data obtained while an animal is feeding. For example, animals which frequently move when feeding tend to be browsers and generally are not actively consuming feed when wandering. Accordingly, such feeding time is to be discounted, via the present invention, by an appropriate factor discussed below in further detail.

It is to be appreciated that significant browsing by the animals 26 normally occurs only when the feeding or drink trough 28 is empty. Obviously, there can be no consumption of food or water when an animal is visiting an empty trough. The system and method should know, or at the very least be able to determine with a certain level of predictability, when the feeding or drink trough 28 is empty and discard or eliminate such data, or drastically discount the same. Nevertheless, animals 26 that browse an empty feeding or drink trough 28 frequently tend to have higher feed intake rates when the feed or water eventually becomes available. Accordingly, the feeding time of such animals, once the feed or water eventually becomes available, should be increased or augmented to accurately reflect the actual feed or water intake rate of such animal 26.

The inventor has also appreciated that age is another element influencing the feed intake rate of animals 26. That is, the older and more mature the animal, the larger the throat of the animal and therefore the faster that animal can consume feed or drink. It is to be appreciated that once an animal is substantially fully grown, this element influences the feed intake rate of animals 26 less in comparison to other fully grown animals 26.

The society hierarchy also influences the feed intake rate of the animals. To exploit this feature, the feeding or drink trough 28 is typically designed to be slightly smaller than the required size such that not all of the animals 26 can feed or drink at the feeding or drink trough 28 at the same time. This insufficient feeding and/or drink space instills competitive feeding and drinking behavior in the animals. After a few days of monitoring the animals 26, it can be readily determined which animals are pushed away by which other animals while feeding or drinking. It is assumed that the pushed away animals endure some stress which is not conducive to feed or drinking intake, but the system and method, of the present invention, can also be used to determine the severity of this insufficient feeding and/or drink space problem.

Inconsistent feeding habits also influence the feed intake rate of the animals. It is widely believed that some animals become acidotic and will, therefore, eat irregularly. By identifying such animals and by changing management and/or ration, the severity of such problems can be minimized or reduce.

Another element relating to the feed intake rate of an animal is the time at which the feeding or drink trough 28 empties.

The inventor believes that the more consistent each animal's diurnal and nocturnal feeding habits, the more accurate the system and method, according to the present invention, can predict the activities of the animals to be monitored.

The speed at which a new animal(s) adapts to new feeding or drinking environment, e.g. date and time when the animal first shows up in the confined area A or pen, also bears a relationship to the feed intake rate of that animal.

Figure 3:
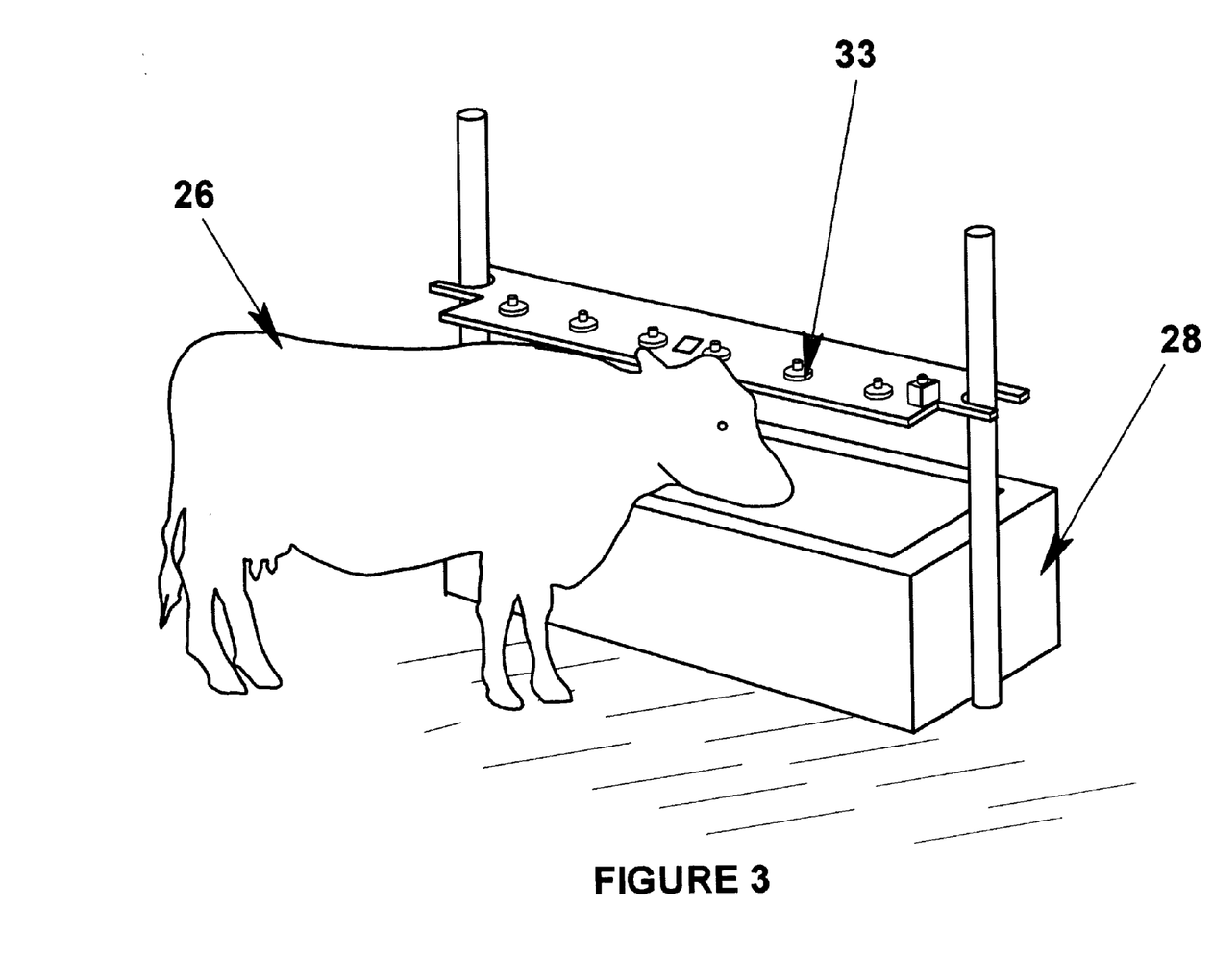
FIG. 3 is a diagrammatic representation showing a chalking system for marking a desired animal.

If it is desired to mark one of the animals to be removed, quarantined or somehow otherwise identified, a chalk powder ejector 33 (FIG. 3) can be used in combination with the present invention. For example, each one of the plurality of antennas can be associated with a chalk powder ejector 33 so that when the desired animal is detected at the feeding or drinking trough 28, a corresponding chalk powder ejector 33 can be activated to disperse an identifying chalk at a desired region of the animal to be identified, e.g. a neck or facial region. Once the animal has been identified, this facilitates readily quarantining, removing, or otherwise treating the marked animal. As the technology for activating the chalk powder ejector 33 would be readily apparent to those skilled in the art, a further detailed description concerning the same is not provided.

Figure 4:
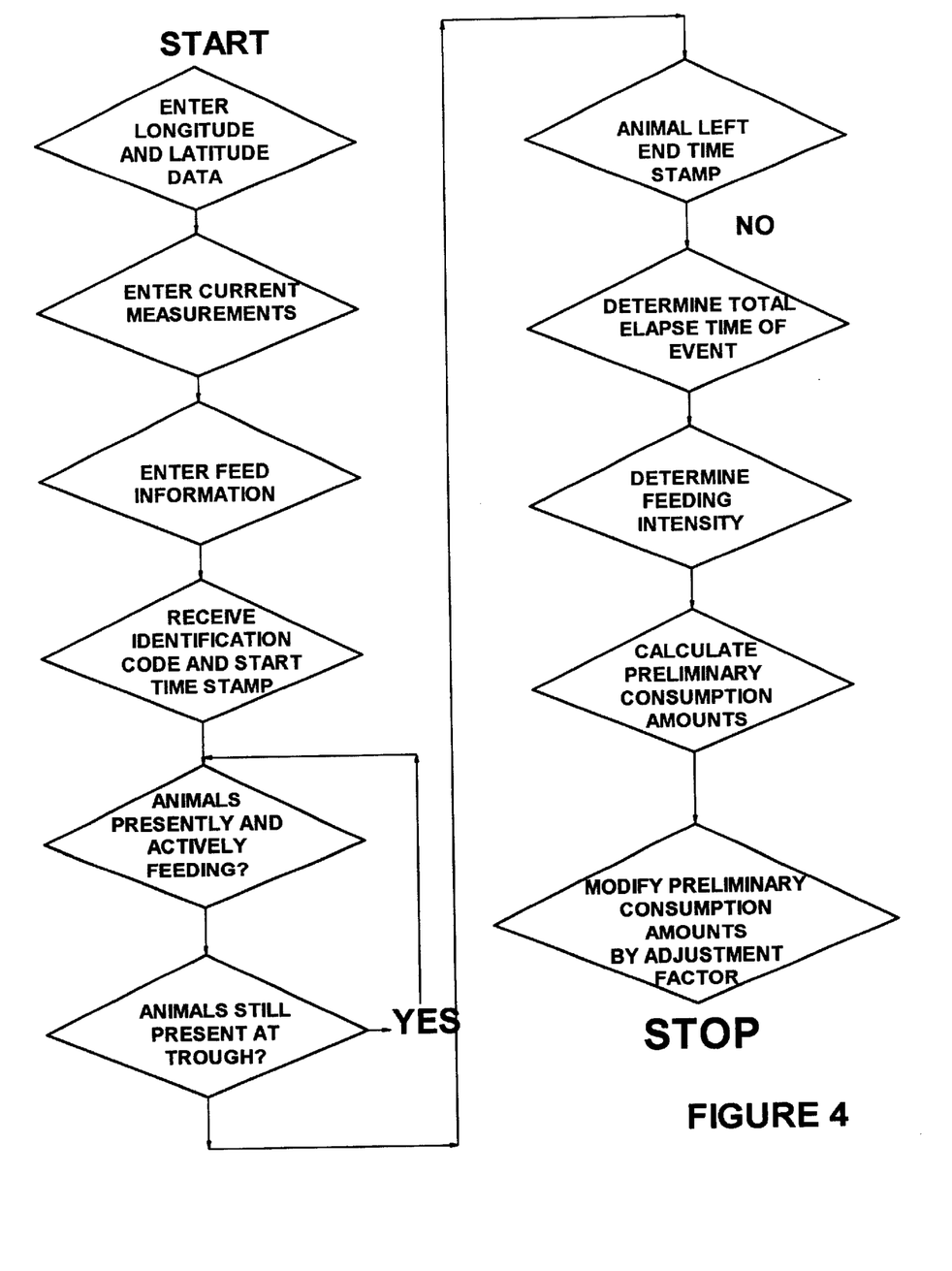
FIG. 4 is a diagrammatic representation showing a flow diagram for determining and predicting a behavior of animals to be monitored by the system and method according to the present invention.

Turning now to FIG. 4, a description concerning a flow diagram, used to determine some desired characteristics to be monitored, will now be described. With reference to FIG. 4, it can be seen that, at step 50, the latitude and the longitude positions of the feeding area or pen A are first imputed into the computer 14 of the system to be used to determine relevant daylight information from known data. Next, at step 52, a variety of data and time measurements are next entered into the computer 14 of the system. For example, the current temperature and/or humidity, the current wind direction and/or wind velocity, the daily and/or weekly precipitation amounts, the current barometric pressure and a measurement indicative of the amount of sunlight, as well as other environmental information, are entered into the system. This information, in turn, can be utilized to alter the adjustment factor which is employed to either discount or augment the preliminarily determined feed or drink intake rate to thereby result in a fairly accurate prediction of the monitored animal behavior.

Figure 5:
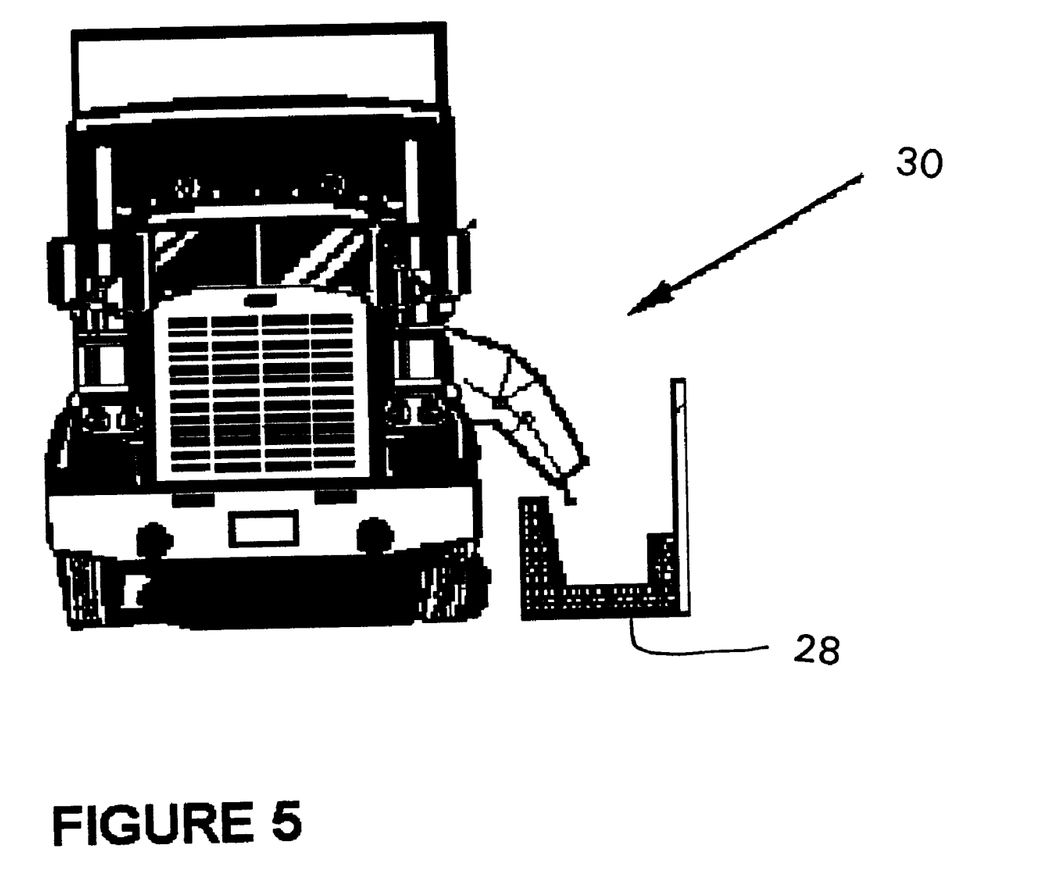
FIG. 5 is diagrammatically shows a feed truck supplying feed to a trough.

At step 54, data relating to the feed are inputted, e.g. the type of feed, the composition or ingredients of the feed, the total weight of feed added to the feeding trough, the associated pen number or other identifying indicia and the time at which the feed was deposited in the pen, whether the feed has any additives, medicine, etc. The system is now ready for monitoring, at step 56, to generate data comprising the location of each detected animal and a time stamp indicative of the total elapsed time of the monitored event, e.g. the total time that the animal was feeding at the feeding trough or drinking trough 28. Feed truck 30 movement will facilitate calculation, by the system, of the amount of feed being deposited by the feeding truck 30 along each discrete section along the feed trough 28 (FIG. 5). This information can be utilized to more accurately predict the feed intake of each animal 26.

In the event that an animal 26 is initially detected at the feeding or drink trough 28, a time stamp for that animal is initiated by the system 10 which indicates the exact time that the animal arrived at the feeding or drink trough 28. The system and method receive the returned unique identification signal from the transponder 12, via the activated antenna 20 and convey this returned signal to the computer 14, via the activated signal relay circuit 23 and the microcomputer 16. It is to be appreciated that the system, according to the present invention, will typically generate about 1500 data points per day for each monitored animal 26. This data will facilitate accurate monitoring of the desired activity or activities of the animal.

During the entire time that the animal 26 is present at the feeding or drink trough 28, the system and method will monitor whether the animal's head is located within the feeding or drink trough 28, at step 58, actively feeding or drinking, e.g. the transponder 12 is detected by two, three or possibly four adjacent antennas 20, or whether the animal's head is located reasonably close to but slightly spaced from the feeding or drink trough 28 (e.g. within about 36 inches or so and detected by only one antenna 20) and passively feeding or drinking or whether the animal's head is located sufficiently far from the feeding or drink trough 28 (e.g. located greater than about 36 inches away from the trough and thus not detected by any antenna 20). That is, the quantity of antennas 20 that receive a return signal from a transponder 12 can be readily used to determine whether or not the animal is feeding at a normal pace, e.g. the return transponder signal is only detected by one or possibly two antennae 20 versus when the return signal is detected by three or possibly four antennae 20 which suggests that the animal's head is located within the feeding or drinking trough 28 and aggressively feeding or drinking.

The system and method periodically check, every few seconds or so, to verify that the animal 26 is still sufficiently close to the feeding or drink trough 28, e.g. within about 36 inches or so or has not wandered sufficiently away from the receiving antenna for a period of time of more than about one minute to about ten minutes, preferably not wandered away from the trough for more than a five minute period. In the event that the system or the method determines that the animal 26 is no longer located at the feeding or drink trough 28, e.g. the animal 26 left for a period of time of about five minutes or more, an end time stamp is generated for that animal 26 by the computer 14, at step 62, which terminates the monitored event and enables the computer 14 to readily determine, at step 64, the total elapsed time that the specific animal was eating or drinking.

At step 66, the feed intensity, i.e. a ratio between the duration of time that the head of the animal 26 is located within or sufficiently adjacent the base of the feeding or drink trough 28 and presumed to be actively feeding or drinking to the time that the head of the animal 26 was located sufficiently away from the feeding or drink trough 28 but only passively feeding or drinking is also determined. This ratio, for a typical animal, is about 50% for a majority of animals and may be as high as 100% for very active eaters or drinkers and may be as low as 5% for passive eaters or drinkers.

Next, a step 68, the amount of feed or water actually consumed by the animal 26, during the total elapsed time of the monitored event, is calculated. Finally, at step 70, the preliminarily calculated amount is then either augmented or discounted by multiplication with a suitable adjustment factor. The adjustment factor will either augment (increase) or discount (decrease) the calculated preliminary amount by a suitable adjustment factor to arrive at a more accurate prediction of the event being monitored.

According to the present invention, the factors which typically are utilized to augment a monitored event are:

It is a rainy day;

The temperature is cold;

The animal is detected browsing around an empty feeding trough;

The animal's head is detected by two or more antennae for at least 50 percent of the total feeding event;

This is the first feeding of the day;

The feeding event is occurring in a competitive environment; and

It has been at least four to five hours since the previous feeding event;

According to the present invention, the factors which typically are utilized to discount a monitored event are:

The feeding event is occurring in the afternoon;

The weather is warmer;

The weather is sunny;

The feeding event is occurring at dusk;

The feeding event is occurring in a non-competitive environment; and

This is the last feeding of the day.

It is to be appreciated that a variety of other factors, as would be apparent to those skilled in the art, can also be used to alter or modify the adjustment factor to facilitate a more accurate prediction of the animal behavior being monitored.

To explain the present invention in further detail, the following example is provided. or by way of explanation.

Assuming that there is a feeding trough 28 and the trough is 16 feet long such that the trough can be divided into 4 sections, i.e. the first section of the feeding trough comprises the first 4 feet, the second section of the feeding trough comprises the next 4 feet, the third section of the feeding trough comprises the next 4 feet and the fourth section of the feeding trough comprises the last 4 feet. In addition, assuming that 160 pounds of feed are equally distributed to the feeding trough 28, there will be approximately 10 pounds of feed for every linear foot along the trough. If sixteen separate scales, each having a length of one foot, are sequentially placed along each linear foot section of the feeding trough 28, it would be readily easy to calculate the actual feed rate for each animal 26 by dividing the amount of feed consumed by the duration of time for which the animal 26 was actually feeding. Accordingly, it is possible, via use of the present invention and suitable scales, to determine an initial feed rate for each animal with high accuracy. However, in most conventional animal raising applications, it is not cost effective and is too time consuming to physically determine the feed rate so that it is necessary to determine the feed rate for each animal in the field while actually consuming food. This can be done by a conventional iteration process.

TABLE 1

(Total Feed Available per section along the trough is 40 Lbs)

| | Minutes | Feeding Rate | Consumed |
|---|---|---|---|
| Section #1 | | | |
| Albert | 9 | 0.75 | 6.75 lbs |
| Martha | 16 | 0.5 | 8 lbs |
| Buttercup | 5 | 0.8 | 4 lbs |
| Daisy | 17 | 1.25 | 21.25 lbs |
| | | TOTAL | 40 lbs |
| Section #2 | | | |
| Albert | 25 | 0.75 | 18.75 lbs |
| Martha | 2 | 0.5 | 1 lbs |
| Buttercup | 5 | 0.8 | 4 lbs |
| Daisy | 13 | 1.25 | 16.25 lbs |
| | | TOTAL | 40 lbs |
| Section #3 | | | |
| Albert | 5 | 0.75 | 3.75 lbs |
| i#iartha | 38 | 0.5 | 19 lbs |
| Buttercup | 20 | 0.8 | 16 lbs |
| Daisy | 1 | 1.25 | 1.25 lbs |
| | | TOTAL | 40 lbs |
| Section #4 | | | |
| Albert | 4 | 0.75 | 3 lbs |
| Martha | 20 | 0.5 | 10 lbs |
| Buttercup | 15 | 0.8 | 12 lbs |
| Daisy | 12 | 1.25 | 15 lbs |
| | | | 40 lbs. |

Based upon the above representative data, the time spent by each animal 26 at each feeding location of the feed trough 28 can be readily determined by the present invention. It is also easy to determine the amount of feed which is available at each location along the feed trough 28 prior to commencement of each feeding or drinking event. It is assumed that the feed intake rate will remain consistent and constant for each animal for a specific period of the day. Based on such assumptions and the known information, a conventional iteration of this data is undertaken to determine the feed rate for each animal. The iteration continues until all the equations "close" or "substantially close". Once equations "close" or "substantially close", the calculated feeding rate of each animal can then be multiplied by the total time spent by each animal and the consumption of feed or drink for each animal during the event, and this is shown in Table 2 below.

TABLE 2

|  | Feeding Rate | Minutes Spent | Daily Cons. |
|---|---|---|---|
| Albert | 0.75 | 43 | 32.25 lbs |
| Martha | 0.5 | 76 | 38 lbs |
| Buttercup | 0.8 | 45 | 36 lbs |
| Daisy | 1.25 | 43 | 53.75 lbs |

Later in the day, the next time a feeding truck 30 passes by and again loads the feed or drinking trough 28 with additional feed or water (FIG. 5), a further calculation of the feed intake rate for each monitored animal can be again determined by the system. Generally, the second and any subsequent iteration process are less involved because the results of the previous iteration provides a better initial indication of the feed rate for each animal to use to determine the amount of feed or drink consumed by each animal.

The present invention seeks to obtain a 70%, and possibly 80% or 90%, accuracy in the ability to be able to predict a specific behavior of an animal being monitored, e.g. the animal's eating or drinking rate. With improved animal predictability, it is easier for farmers to select the best breed or genetic species of animal which will consume the least amount of feed and drink but will also convert such consumed feed and drink into body weight and thereby minimized the costs associated with fattening animals prior to slaughter. In addition, the present invention is useful in assisting farmers in determining which animals or types of animals have the slower metabolisms so they can readily convert the consumed feed in the body weight and thus will be less expensive to raise than other animals with higher metabolism rates that consume larger amounts feed while increasing their body weight at a much slower rate.

Another important aspect of the present invention is the ability to monitor the location of feed or watering trucks 30 (FIG. 5) which are supplying feeding or water to the troughs 28. Each feed or watering truck can be installed with a suitable transponder 30 which sends a signal that is picked up by one of the antennas 20 in the mat 22 or a specifically designated truck antenna. By this arrangement, the stopping location of each feed or liquid truck can be readily determined and ensured that the proper feed or liquid is deposited in the proper feeding or drinking trough for consumption by the desired animals. It is to be appreciated that sometimes the feed or liquid is sometimes combined with a specific chemical, composition, medicine, additive, etc. to obtain a desired effect on the animals consuming the feed or liquid. By being able to monitor what feed or liquid is being deposited by which truck into which feeding or drinking trough, the present invention assures improved quality control of the feeding and drinking process and minimizes quality control problems which are inherently present in the prior art feeding and monitoring systems.

It is to be appreciated that the more antennas that pick up a transponder, the closer the transponder is located to the feeding trough. Accordingly, if two or more transponders pick up an antenna, it is a very good indication that the animal is actively feeding. Accordingly, the more antennas that pick up a transponder, the closer the animal is to the feeding trough and in all likelihood, the more aggressively that animal is feeding or drinking. This information can be used to augment the amount of feed or drink being consumed by the animal.

While the present invention has been described basically with respect to the feeding activities of animals, such as cattle, pigs, lambs, etc., it is to be appreciated that the system, according to the present invention, has a variety of other conceivable applications. For example, each bus of a bus line could be installed with a passive transponder 12 and a maintenance facility for the busses of the bus line, could be equipped with a plurality of antennas 20, e.g. each parking space and/or vehicle maintenance location within the maintenance facility could have an antenna 20 located adjacent that parking space. By this arrangement, when a bus with a passive transponder 12 is located within the bus maintenance facility and at or adjacent one of the parking spaces equipped with an antenna 20, the antenna 20 will transmit a signal to the passive transponder 12 and receive a return signal, as with the previous embodiment. The return signal is then communicated to the microprocessor 16 and computer 14 so that the bus line will instantaneously know the exact location where each one of the buses, situated within the parking and/or maintenance facility, is located and may use this information to determine when maintenance work for a bus has been completed, for example, e.g. when a bus is moved from a maintenance location to parking location.

Since certain changes may be made in the above described system and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A method of monitoring animal feeding behavior, comprising the steps of:
   providing a plurality of antennas at predetermined locations along one of a feeding location and a drinking location to be monitored;
   providing each of a plurality of animals with a passive transponder having a unique identification code;
   transmitting an electronic signal from at least one of said plurality of antennas to any sufficiently adjacent animal provided with a passive transponder and receiving a return electronic signal from any sufficiently adjacent passive transponder;
   processing said return electronic signal via a computer, to determine preliminary results relating to an animal behavior which affects animal feeding characteristics; and
   modifying the preliminary results via a modification factor to generate a final result that predicts, with an acceptable level of predictability, the animal behavior which affects a consumption activity to be monitored.

2. The method according to claim 1, further comprising the steps of:
monitoring which of said plurality of animals, during a consumption activity, is located beside which other animals of said plurality of animals; and
monitoring which animals of said plurality of animals, during the consumption activity, consume prior to which other said plurality of animals.

3. The method according to claim 1, further comprising the steps of:
determining a total elapsed time actually spent by each of said plurality of animals during a consumption activity; and
monitoring a location of each of said plurality of animals during the consumption activity.

4. The method according to claim 1, further comprising the steps of:
monitoring deviations, during a consumption activity, of at least one of said plurality of animals relative to a remainder of the other of said plurality of animals; and
monitoring deviations in a consumption activity of each one of said plurality of animals relative to an expected consumption activity of each one of said plurality of animals.

5. The method according to claim 1, further comprising the steps of utilizing a microprocessor and a reader which are both coupled to a plurality of signal relay circuits as electronic components, and coupling each one of the signal relay circuits to one of said plurality of antennas; and
sequentially providing a signal to each one of said plurality of antennas.

6. The method according to claim 1, further comprising the step of measuring at least one of a feed intake rate of each of said plurality of animals, a water intake rate of each of said plurality of animals and whether any of said plurality of animals has one of an upset stomach and acidosis.

7. The method according to claim 1, further comprising the step of transmitting data from a computer interface of the computer to a computer interface coupled to a flexible mat to facilitate the transfer of information to and from the computer and the flexible mat.

8. The method according to claim 7, further comprising the steps of:
equipping a panel with a light to indicate proper operation thereof;
designing the panel to be easily removed from the flexible mat;
operating the panel with one of 12 volts VDC and 115 volts VAC; and
providing the panel with memory means contained therein for storage of information.

9. The method according to claim 7, further comprising the step of locating antenna wires on opposite sides of the flexible mat to thereby reduce negative effects of surrounding material upon activation thereof.

10. The method according to claim 1, further comprising the step of providing a data compression mechanism to minimize a transmission time between the panel and the computer.

11. A system for monitoring animal feed behavior, said system comprising:
an elongate mat having a plurality of antennas spaced therealong;
a plurality of passive transponders, each passive transponder having a unique identification code so that when the passive transponder is affixed to an animal, the passive transponder facilitates identification of that animal;
an electronic control system for transmitting the electronic signal sequentially to each one of said plurality of antennas such that an activated antenna emits the signal and, any sufficiently passive transponder sufficiently adjacent to the activated antenna, receives the signal and generates a return electronic signal which is sent to the activated antenna;
a computer, coupled to said plurality of antennas, to receive a return signal from the passive transponder and generating preliminary results to an animal behavior which affects animal feeding characteristics; and
modification factor, incorporated in the computer, for modifying the preliminary results to generate a final result that predicts, with an acceptable level of predictability, the animal behavior which affects a consumption activity to be monitored.

12. The system according to claim 11, wherein the electronic components comprise a microprocessor and a reader which are both coupled to a plurality of signal relay circuits, and each one of the signal relay circuits is coupled to one of said plurality of antennas; and
the system sequentially provides a signal to each one of said plurality of antennas.

13. The system according to claim 11, wherein the system is able to identify the location of each of said plurality of animals, relative to the mat incorporating the plurality of antennas.

14. The system according to claim 11, wherein the system measures at least one of the feed intake rate of each of said plurality of animals, the water intake rate of each of said plurality of animals and whether any of said plurality of animals has one of an upset stomach and acidosis.

15. The system according to claim 11, wherein data is transmitted from the computer interface of the computer to a computer interface coupled to the flexible mat to facilitate the transfer of information to and from the computer and the flexible mat.

16. The system according to claim 11, wherein the panel is equipped with a light indicating that the system is operating properly;
the panel can be easily removed from the mat;
the panel operates on one of 12 volts VDC and 115 volts VAC; and
the panel has memory means contained therein for storage of information.

17. The system according to claim 11, wherein the system is provided with the data compression mechanism to minimize the transmission time between the panel and the computer.

18. The system according to claim 11, wherein the antennas comprise antenna wires are located on opposite sides of the mat to thereby reduce negative effects of surrounding materials upon activation thereof.

19. The system according to claim 11, wherein the system includes means for monitoring which of said plurality of animals, during a consumption activity, is located beside which other animals of said plurality of animals; and
means for monitoring which animals of said plurality of animals, during the consumption activity, consume prior to which other of said plurality of animals.

20. The system according to claim 11, where the system includes means for determining a total elapsed time actually spent by each of said plurality of animals during a consumption activity;

means for monitoring a location of each of said plurality of animal during the consumption activity;

means for monitoring deviations, during a consumption activity, of at least one of said plurality of animals relative to a remainder of the other of said plurality of animals; and means for monitoring deviations in a consumption activity of each one of said plurality of animals relative to an expected consumption activity each one of said plurality of animals.

* * * * *